United States Patent Office 3,433,651
Patented Mar. 18, 1969

3,433,651
FROZEN DESSERT AND METHOD OF
MAKING THE SAME
Holton W. Diamond, 300 Depew Ave.,
Buffalo, N.Y. 14214
No Drawing. Filed Jan. 15, 1965, Ser. No. 425,952
U.S. Cl. 99—136　　　　　　　　　　　　　5 Claims
Int. Cl. A23g 5/00

ABSTRACT OF THE DISCLOSURE

Preparation of an ice cream type frozen dessert by whipping an emulsion of dairy fat, emulsifier, foaming stabilizer and water; separately whipping a frappe containing sweetener, foaming stabilizer and water, blending the emulsion and frappe and subsequently freezing.

---

This invention relates to a frozen dessert and method of making the same, and more particularly to a frozen dessert of the ice cream type exhibiting unique and heretofore unknown properties. It relates further to a frozen dessert of the ice cream type which is adapted to storage and handling at substantially higher temperatures than products of the prior art, and which is adapted to be served at temperatures in excess of 30° F. in firmly aerated form, a possibility which did not exist with the older type frozen dessert of the prior art.

Ice cream type aerated frozen desserts including ice milk, imitation ice cream, mellorine and others are well known. The properties and characteristics of such products of the prior art also are quite well known, there having been a very great deal of literature published in this field.

Conventionally in the prior art, an emulsion was prepared by mixing, pasteurizing, and homogenizing together, with subsequent cooling to about 40° F. before freezing, such common and usual major ingredients as milk, sugar, and cream together with such minor ingredients as flavoring, stabilizers, and emulsifiers. This completed emulsion at about 40° F., unaerated and unwhipped, was then fed into a type of heat exchanger, either of the batch type or of the continuous type, in which the product was cooled with agitation by rotating blades and beaters to a temperature of between 30° F. and 25° F. As the temperature of the emulsion or mix dropped below 30° F., the mix ordinarily began to retain ingested air whipped into it by the rotating blade and beater. The mix conventionally was allowed to incorporate approximately its own volume of air and then was permitted to emerge from the heat exchanger freezing device in a semi-solid somewhat flowable and aerated form at about 20° F. to 25° F. This incompletely frozen dessert was packaged and placed in hardening rooms in which the surrounding air temperature was substantially below 0° F. and generally minus 20° F. or lower where freezing of the product to an extremely hard consistency was accomplished over a period of hours.

In the prior art, the frozen aerated dessert of ice cream type was returned to cabinets or rooms for holding and storage at temperatures of about minus 10° F. to minus 20° F. until needed for shipment, delivery, or use. Ice cream generally has been served for eating at temperatures of about plus 8° F. to plus 10° F., at which temperatures it is sufficiently malleable to be palatable.

The conventional frozen dessert of the ice cream type represented by products of the prior art upon reaching temperatures in excess of 30° F. ordinarily returned to liquid or near liquid form, losing its shape and losing its air within half an hour or thereabouts. In other words, it did not hold its firmly aerated form at temperatures in excess of 30° F.

A further limitation in the conventional ice cream type frozen dessert is its requirement to be held during storage of several months duration at temperatures at or below minus 20° F. Failure to observe the precaution of storing conventional ice cream at these relatively low temperatures has resulted in the development of undesirable properties sometimes referred to as "sandiness" or "graininess," which are manifestations of the development and growth of palpably large crystals of the sugar lactose and of ice.

As a result of the foregoing characteristics and limitations, the ice cream type frozen dessert of the prior art has not been suited to distribution through ordinary frozen food channels along with frozen vegetables, frozen fruits, and other frozen commodities in general commerce. "Frozen food temperatures," as the term is used in the jargon of this trade, refers to the usual temperatures of cabinets in grocery stores, to the ordinary temperatures of frozen vegetable delivery trucks, and to the temperatures in the frozen food sections of public and other storage warehouses. "Frozen food temperatures" is a term generally understood in the trade to mean temperatures of 0° F. to plus 10° F. The ice cream type of frozen dessert as heretofore prepared and known has been stored under temperature conditions approximately 30° lower (at or about minus 20° F.) than frozen vegetables; has been delivered to the grocery in quite heavily insulated delivery trucks, some having mechanical refrigeration in addition to the insulation, and has been sold by the grocery from special "ice cream" cabinets, also heavily insulated and also held at temperatures substantially lower than the temperatures of the cabinets in which the grocery displays substantially all its other frozen foods.

It is a purpose of the present invention to provide a frozen dessert of the ice cream type which can be manufactured, stored, distributed and sold at ordinary frozen food temperatures of 0° F. to plus 10° F.

It is another object of this invention to provide a frozen dessert of the ice cream type which retains its soft, gel-type, aerated form after its return from frozen food temperatures to temperatures in the neighborhood of about 40° F. for at least one hour without substantial deterioration by change of shape, melting or syneresis. In other words, the aerated ice cream type frozen dessert of the present invention can be served by the housewife or restaurant operator in an aerated pudding-like consistency substantially without breakdown of the dessert's aerated, gel-type structure at 40° F.

Other objects and advantages of my invention appear in its further description which follows.

By virtue of the relatively higher temperatures and greater ease of preparing this frozen dessert, and by virtue of its capability of being distributed nationally through ordinary frozen food distribution channels from relatively large factories, rather than through the costly and usual three-times-per-week ordinary local delivery of locally manufactured ice cream of the prior art, an overall greater efficiency of production in manufacture and distribution is made possible, and an overall reduction in unit cost to the consumer of this very wholesome, popular, and nutritious type dessert is brought within reach. Accompanying these advantages and benefits, a basis is provided for a consequent larger per capita consumption in the United States of this outlet for the products of the dairy farmer and other farmers.

The Federal Standards of Identity for Frozen Desserts under the Federal Food Drug & Cosmetic Act, Part 20, Title 21, Code of Federal Regulations, as appearing in the Federal Register of July 27, 1960, offer prototype, representative formulas for the ice cream, ice milk, frozen custard, and other aerated ice cream type frozen desserts of the prior art.

As noted earlier, these products of the prior art normally are permitted to undergo aeration and to retain ingested air only as the temperature of their liquid emulsions are reduced from about 30° F. to about 25° F., and that as these products of the prior art are returned to temperatures above 30° F., this aeration is lost.

I have discovered that an extremely stable aerated structure in this type emulsion can be obtained by pre-aerating the entire mix at temperatures in excess of freezing (32° F.) to form a substantially firm, gel-like, aerated mass which may then be frozen and upon defrosting will retain this aerated, soft, gel-like form without breakdown.

An accompanying effect of the pre-aeration and whipping of the formula with essentially complete entrapment and secure cellular binding of the water of the mix is the ability of the pre-whipped ice cream type of frozen dessert of the present invention to withstand, without degradation and deterioration, substantially higher temperatures of storage for shipment and delivery and sale than the products of the prior art; viz, temperatures of 0° F. to plus 10° F., the general range of temperatures within which the less perishable ordinary frozen fruits and vegetables and the like are handled.

Although a large technology has been developed in the manufacture of ice cream, and although technical literature relating to the manufacture and compounding of ice cream is voluminous, to the best of my knowledge no one knows the precise nature of the mechanism by which ice cream is "whipped" and made to contain an equal volume of air in its finished form; i.e., to achieve 100% "overrun" during freezing, so that one gallon of liquid mix furnishes two gallons of frozen ice cream with only slight shrinkage. This increased volume, whatever the precise mechanism may be by which the aeration occurs, is maintained during many months of storage at temperatures of minus 20° F. and below. However, ice cream prepared by the conventional method promptly melts to a liquid form and loses its aeration, returning to near its original "liquid mix" volume, on reaching temperatures in excess of approximately 30° F. Furthermore, the ice cream of the prior art deteriorates in quality, both losing aeration (shrinking) and becoming grainy and sandy in texture when stored at plus 10° F.

One way (a laboratory method also suited to large-scale production) of preparing the pre-whipped ice cream type frozen dessert of the present invention is to select from the "Federal Standards of Identity" type formula for frozen desserts a given prototype formula of ingredients and then to separate these ingredients appropriately as hereinafter described into a fat-containing "whippable emulsion" and a non-fat "frappe," each of which is whippable to a substantially firm, aerated, gel-like form before freezing. Such a non-fat frappe can be whipped to a firm, stiff foam at temperatures of 70–80° F. The other group of ingredients, having been mixed, pasteurized, homogenized, and cooled, becomes a fat-containing emulsion capable of being whipped to a firm stiff foam at 40–50° F. In this method of preparing the product of the present invention, the two foams are blended at temperatures well above freezing to furnish a foamed material having the ingredient composition exemplified by the Federal Standards of Identity type formulation. This blended, complete material is a firm, stiff foam at 60–65° F. or thereabouts.

If desired, the temperature of this material can then be reduced further with agitation, or it can be frozen quiescently.

Upon return to temperatures of about 40° F., this frozen dessert retains its shape and form and consistency at least two hours at 40° F. without perceptible appearance of liquid material.

In its frozen form, this aerated material also withstands extended storage of two or more months at temperatures of 0° F. to plus 10° F., within the range of normal, ordinary frozen food handling temperatures, without substantial deterioration, with regard to shrinkage, graininess or sandiness.

Many different kinds of machinery may be used to bring about the phenomenon which is referred to as "whipping" which has as its aim and objective the entrapping of both water and air in the emulsion in some way not as yet understood so that the liquid material loses most or substantially all of its properties of fluidity and becomes a material which is self-supporting and capable of holding its own shape and form.

Ordinary ice cream freezers used in the ordinary way do not accomplish aeration of ice cream type mixes to such firm, stiff foams at temperatures above freezing.

Among the machines presently available for use in whipping emulsions without freezing them are the high speed continuous whipper of the American Machine & Foundry Company, that of the E. T. Oakes Company, that of The Creamery Package Company, and others well known and widely used in the bakery and whipped topping trades.

In preparing relatively small quantities of dessert mix in accordance with the present invention, various kinds of upright beaters having wire whips rotating rapidly within the confines of a mixing bowl can be used. Typical of these is the Hobart Model N–50–G five-quart bakery mixer, with wire whip. For preparation in this type equipment, the dessert mix of the present invention should be divided into two parts, a whippable emulsion and a frappe, as described.

An illustration of the preparation of my invention is shown in the following example:

EXAMPLE I

A whippable emulsion was prepared of the following ingredients:

| | Grams |
|---|---|
| Butter | 600.0 |
| Tween 65 | 10.0 |
| Myverol 18–30 | 20.0 |
| Non-fat milk solids | 1600.0 |
| Water | 2770.0 |
| Total | 5000.0 |

In the above formulation, the butter is of the ordinary unsalted dairy type used in the conventional manufacture of ice cream and provides the fat content for the emulsion. Tween 65 as used herein is a trademark for a member of a group of common emulsifiers specifically described as complex mixtures of partial esters of fatty acids and sorbitol-derived hexitol anhydrides in which polyoxyethylene chains have been added to the non-esterified hydroxyl groups of the hexitol anhydride.

Myverol 18–30 as used herein is a trademark for a member of the general group of emulsifiers referred to in the trade as mono- and diglycerides. Thus Tween and Myverol are used as emulsifiers or surfactants.

The protein in the non-fat milk solids acts as a foaming stabilizer.

This emulsion was pasteurized approximately ½ hour at 145° F., then passed through a small (15 gallons per hour capacity) Manton-Gaulin homogenizer at pressures of 2500 p.s.i. (gauge) on the first stage and 500 p.s.i. (gauge) on the second stage valves, cooled to about 40° F., and placed in the refrigerator for storage.

A second part of the frozen dessert in the form of a non-fat frappe type of whipping compound was prepared with the following ingredients:

| | Grams |
|---|---|
| Sugar | 150.0 |
| Carrageenin (Gelcarin M.R. 100) | 5.0 |
| Sodium caseinate | 10.0 |
| Water | 335.0 |
| Total | 500.0 |

In the above formulation, the sugar may be of any suitable type. Carrageenin (Gelcarin M.R. 100)) is a thickening and protective colloid type stabilizer. Sodium caseinate acts as a foaming stabilizer.

Preparatory to whipping the frappe, 500 grams of the cooled, stored whippable emulsion were measured out and held in the refrigerator at about 40° F. After the ingredients of the frappe had been weighed out and prepared, the 500 grams of whippable emulsion, at about 40° F., was whipped 10 minutes at speed 2 on the laboratory model Hobart N–50–G mixer with the wire whip attached to the beating mechanism. The overrun of the whipped emulsion was approximately 200%. This portion of whipped fat-containing emulsion was set aside, and in another bowl of like size, and in the same machine, the non-fat frappe was whipped separately.

During whipping of the frappe ingredients, which had been heated to 160° F., during dissolving and mixing of the ingredients, the temperature of the frappe was allowed to drop to approximately room temperature, of about 70° F. The whipping of the frappe also was accomplished at speed 2 the Hobart 5-quart N–50–G upright mixer using the wire whip on the whipping mechanism. The whipping time of the frappe was 8 minutes, and its overrun was 210%.

The two foamed parts of the dessert mix were blended each with the other, 500 grams of each by weight, at speed number 2 on the same machine for one minute. The completed blend was a stiff, aerated foam having an overrun of 99%. Its temperature was 62° F. as it was removed from the Hobart mixing bowl. Samples of the aerated dessert mix were filled into paper cups and placed in an air-blast freezer maintained at minus 8° F. for freezing overnight.

The following day, the samples were removed from the freezer, removed from their paper cup containers, and placed on small china serving plates in the refrigerator at about 41° F. After 4 hours at this temperature, the samples had retained their shape and exhibited no visually perceptible liquid at all, through melting or syneresis.

It may be noted that the composition given above after final blending was an "ice milk" within the meaning of the Federal Standards of Identity for ice milk with relation to ingredients and levels thereof. Ice milk is an ice cream type dessert having a lower fat level than ice cream as each is defined in the Federal Standards of Identity for Frozen Desserts. This foregoing statement is well understood and represents common knowledge in the trade.

It may also be noted that the preparation of the firm and completely aerated dessert mix of the ice cream type in the example described above before freezing, is a laboratory procedure, using laboratory equipment including a type of mixing device which never is used in the aeration of an entire, complete, non-separated dessert mix of the ordinary ice cream or ice milk type. In this type of equipment, I have found the separation of the complete mix into two parts, a fat-containing whippable emulsion and a non-fat frappe essential.

The essential requisite to the production of my invention is that the aerated structure of the ice cream type dessert which is to be frozen shall have been obtained entirely before the mix is subjected to freezing temperatures. Although the mechanism by which the phenomenon of whipping occurs is not understood, it does appear that in some manner when the aforesaid complete and entire aeration to a firm stiff body in such a dessert mix is accomplished prior to freezing, both the water and the air have become so entrapped as to render the frozen aerated material stable toward both relatively high storage temperatures as compared with conventional ice cream type frozen desserts, and also relatively high serving temperatures as compared with those of the conventional ice cream type frozen desserts. The product of this invention after having been frozen is capable of retaining its shape and form without breakdown at 40° F. when desired, but also is suited to being served and consumed as, and in the fashion of, the product of the prior art, at temperatures of plus 8–10° F.

The eating properties of the present invention are not discernibly different to those skilled in the evaluation of ice creams and ice cream-like desserts such as ice milk from the eating properties of the conventional type ice cream frozen dessert at the ordinary serving temperatures of plus 8–10° F.

In accordance with the present invention, a frozen dessert of the ice cream type includes a blend of edible fat, sweetener, foaming stabilizer and water, as essential, ingredients. Any edible fat of animal or vegetable origin is suitable for the practice of the present invention and the term "edible fat" as used herein also includes oils in liquid or semi-solid form, or mixtures of fats or oils. Preferably, the fat content of the inventive frozen dessert is from about 2% to about 25% by weight. As used herein, the phrase "frozen dessert of the ice cream type" is intended to include such representative products as ice cream, ice milk, imitation ice cream, mellorine, frozen custard and other similar frozen and aerated fat containing or emulsion desserts of dairy or non-dairy character, but specifically exclude fruit sherbets and water ices. As used herein, the verbs "whip" and "aerate" are used synonymously.

It will be obvious to those skilled in the art that non-essential flavoring ingredients, condiments, artificial coloring and the like may be added without in any affecting the essential nature of the invention.

It is essential to the practice of the present invention that the fat-containing emulsion, whether the whole or part of the dessert mix or blend, must be whipped or aerated at a temperature above freezing and accompanied by a rise in temperature of from about 5° to about 10° F. in order to provide stability after freezing.

It will also appear to those skilled in the art that various and different types of whipping devices and procedures can furnish a pre-whipped emulsion entirely aerated and stiffened before freezing, as contemplated in the present invention, and that the illustration given is merely an illustration of one way in which the invention can be practiced.

What is claimed is:

1. The method of making a frozen dessert of the ice cream type comprising whipping at a temperature above 32° F. and accompanied by a rise in temperature of about 5° to about 10° F. an emulsion containing edible dairy fat, emulsifier, foaming stabilizer and water to form a first whipped part, whipping at a temperature above 32° F. a frappe containing sweetener, foaming stabilizer and water to form a second whipped part, blending at a temperature above 32° F. said first and second whipped parts, and subsequently freezing the blended product.

2. The method of making a frozen dessert of the ice cream type comprising whipping at a temperature above 32° F. and accompanied by a rise in temperature of about 5° to about 10° F. an amulsion containing edible dairy fat, emulsifier, foaming stabilizer and water to form a first whipped part, whipping at a temperature above 32° F. a frappe containing sweetener, foaming stabilizer and water to form a second whipped part, blending said first and second whipped parts, and subsequently freezing the blended product.

3. The method of making a frozen dessert of the ice cream type comprising aerating at a temperature above 32° F. and accompanied by a rise in temperature of about 5° to about 10° F. an emulsion with the ingestion of a gas to form a first aerated part, said emulsion containing edible dairy fat, emulsifier, foaming stabilizer and water, aerating a frappe with the ingestion of a gas to form a second aerated part, said frappe containing sweetener, foaming stabilizer and water, blending said first and second aerated parts, and subsequently freezing the blended product.

4. The method of making a frozen dessert of the ice cream type comprising the steps of whipping at a temperature above 32° F. and accompanied by a rise in temperature of about 5° to about 10° F. an emulsion containing 600 parts per weight of edible dairy fat, 1600 parts per weight of non-fat milk solids, 2770 parts per weight of water and an emulsifier to form a first whipped part, whipping at a temperature above 32° F. a frappe containing 150 parts per weight of sugar, 335 parts per weight of water and a foaming stabilizer to form a second whipped part, blending said first and second whipped parts, and subsequently freezing the blended product.

5. A frozen dessert of the ice cream type made according to the method of claim 3.

References Cited

UNITED STATES PATENTS

| 2,558,453 | 6/1951 | Minster | 99—136 |
| 2,913,342 | 11/1959 | Cameron et al. | 99—139 X |

OTHER REFERENCES

Frandsen and Arbuckel, Ice Cream and Related Products, Avi Publishing Co., Westport, Conn., 1961, pp. 43–45.

RAYMOND N. JONES, *Primary Examiner.*

J. M. HUNTER, *Assistant Examiner.*